US010296308B2

(12) United States Patent
Lance

(10) Patent No.: US 10,296,308 B2
(45) Date of Patent: May 21, 2019

(54) AUTOMATICALLY GENERATING NETWORK APPLICATIONS FROM DESIGN MOCK-UPS

(71) Applicant: Adobe Inc., San Jose, CA (US)

(72) Inventor: Renee Helen Lance, Sydney (AU)

(73) Assignee: ADOBE INC., San Jose, CA (US)

( * ) Notice: Subject to any disclaimer, the term of this patent is extended or adjusted under 35 U.S.C. 154(b) by 427 days.

(21) Appl. No.: 14/925,314

(22) Filed: Oct. 28, 2015

(65) Prior Publication Data

US 2017/0123641 A1 May 4, 2017

(51) Int. Cl.
G06F 17/00 (2019.01)
G06F 8/38 (2018.01)
G06F 8/30 (2018.01)
G06F 8/34 (2018.01)

(52) U.S. Cl.
CPC .................. G06F 8/38 (2013.01); G06F 8/30 (2013.01); G06F 8/34 (2013.01)

(58) Field of Classification Search
CPC ....................................................... G06F 17/00
See application file for complete search history.

(56) References Cited

U.S. PATENT DOCUMENTS 7,805,671 B1 * 9/2010 Corell .................... G06F 17/227
715/235
8,290,905 B1 * 10/2012 Little ................ G06F 17/30997
345/650
8,413,062 B1 * 4/2013 Little ........................ G06F 8/38
715/762
8,417,728 B1 * 4/2013 Anders ...................... G06F 8/34
707/793
2006/0104511 A1 * 5/2006 Guo .................... G06K 9/00469
382/176
2014/0229818 A1 * 8/2014 Goswami ............ G06F 17/2247
715/234
2014/0250419 A1 * 9/2014 Ivmark ..................... G06F 8/20
717/101
2014/0282115 A1 * 9/2014 Balogh ............. G06F 17/30902
715/760
2014/0282139 A1 * 9/2014 Balogh .................. G06F 17/24
715/765
2014/0310591 A1 * 10/2014 Nguyen .............. G06F 17/2247
715/234
2015/0100946 A1 * 4/2015 Brunswig ........... G06F 11/3664
717/124
2015/0227270 A1 * 8/2015 Yun ....................... G06F 3/0482
715/202
2015/0310122 A1 * 10/2015 Hall ...................... G06F 17/212
715/234

* cited by examiner

*Primary Examiner* — Mahelet Shiberou
(74) *Attorney, Agent, or Firm* — Keller Jolley Preece

(57) ABSTRACT

The present disclosure is directed to providing a network application creation system that facilitates generating network applications from a design layout. In general, the network application creation system automatically generates one or more network applications from a design mock-up created by a user, such as a designer. For example, the network application creation system can provide one or more network applications to a user without requiring the user to hand code the design layout into the one or more network applications. In some example embodiments, the network application creation system generates structured files, style files, and/or asset files from a design layout and create a network application based on the generated files.

20 Claims, 11 Drawing Sheets

AUTOMATICALLY GENERATING NETWORK APPLICATIONS FROM DESIGN MOCK-UPS

BACKGROUND

1. Technical Field

One or more embodiments of the present disclosure relate generally to generating network applications (e.g., native mobile applications or web pages). More specifically, one or more embodiments of the present disclosure relate to systems and methods for automatically generating one or more network applications from a design mock-up created using a design program.

2. Background and Relevant Art

Designers of network applications often use image editing and other design programs, such as ADOBE® PHOTOSHOP® to create detailed mockup designs of a network application. For example, a designer lays out images, text, and other elements, as he or she would like them presented to an end user in the network application. When the network application involves multiple pages, the designer individually arranges and mocks up each page.

When a designer completes the mockup of the network application, the next step is to code a network application, such as a webpage. Either the designer needs to become proficient as a developer so as to be able to code the webpage or the designer must pass the design mockup over to a developer. A developer (whether the designer or another person) uses the design mockup as a model/template in recreating the network application from scratch. In general, the developer identifies elements, such as images and text, in the model design and hand codes each element according to the design mockup. Further, the developer may have to manually code the functionality of each design element. As such, the process of developing a network application from a design mockup can take weeks, or longer, to complete.

In addition, in order to hand code a design mockup to convert the mockup into a network application, the developer may need to have the sufficient knowledge, expertise, and skills to complete the task. If the developer does not have the proper skills or expertise, the developer often must spend time learning the additional skills, which adds time to the development process. Alternatively, the developer can seek assistance from other developers. For example, when the design is complex or requires complex functionality, the developer can work with other developers in a team. But working with a team does not necessarily improve the speed of development, and often adds additional delays to the development process.

As an additional problem, when a design is used as a model for multiple network applications, distributed via multiple distribution channels (e.g., mobile, web, email), the developer often needs to separately code each network application. As such, depending on the number of network applications and the complexity involved with the development of each network application, the time needed to complete development of the network application may be further extended.

As another drawback with conventional systems and methods, when the designer passes off the design to a separate developer, the designer often has to relinquish control of the design to the developer and allow the developer to modify the design for development purposes. For example, if the developer encounters issues with the proposed functionality or layout of an element in the design, the developer may modify the element or change the desired functionality. Each time the developer deviates from the design; the designer loses ownership/control of the intended design.

Further, if the designer is not satisfied with the network application after the developer completes developing the network application, the designer may apply changes such that the developer needs to recode the network application. For example, the designer may not be satisfied when the developer modifies elements of the design. In many instances, the designer needs to meet with the developer when having the developer apply the requested changes, which is not always possible and often not convenient for either the designer or the developer.

These and other Internet-based problems exist with conventional systems and methods of generating network applications from a design mock-up.

BRIEF SUMMARY

Embodiments of the present disclosure provide benefits and/or solve one or more of the foregoing or other problems in the art with systems and methods for automatically generating network applications from a design mockup or layout. In one or more embodiments, the systems and methods described herein automatically generate one or more network applications from a design mock-up created by a user, such as a designer. The systems and methods provide a network application to a designer without the need of coding the design by hand. As such, the systems and methods allow a designer to create/view a generated network application prototype and/or network application without the need of a developer. To illustrate, the systems and methods receive a design created by a user, such as a design mock-up created with an image editing tool. The systems and methods identify asset information for the elements used in the design mock-up. Further, based on semantic information associated with each element, the systems and methods generate structured data and style data. Using the structured data, assets, and style data, the systems and methods generate a functioning network application shell of the network application.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the disclosed systems and methods can be obtained, a more particular description of this disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore considered to be limiting of its scope, the invention will be described and explained with additional specificity and detail through the use of the accompanying drawings in which.

DETAILED DESCRIPTION

Figure 1:
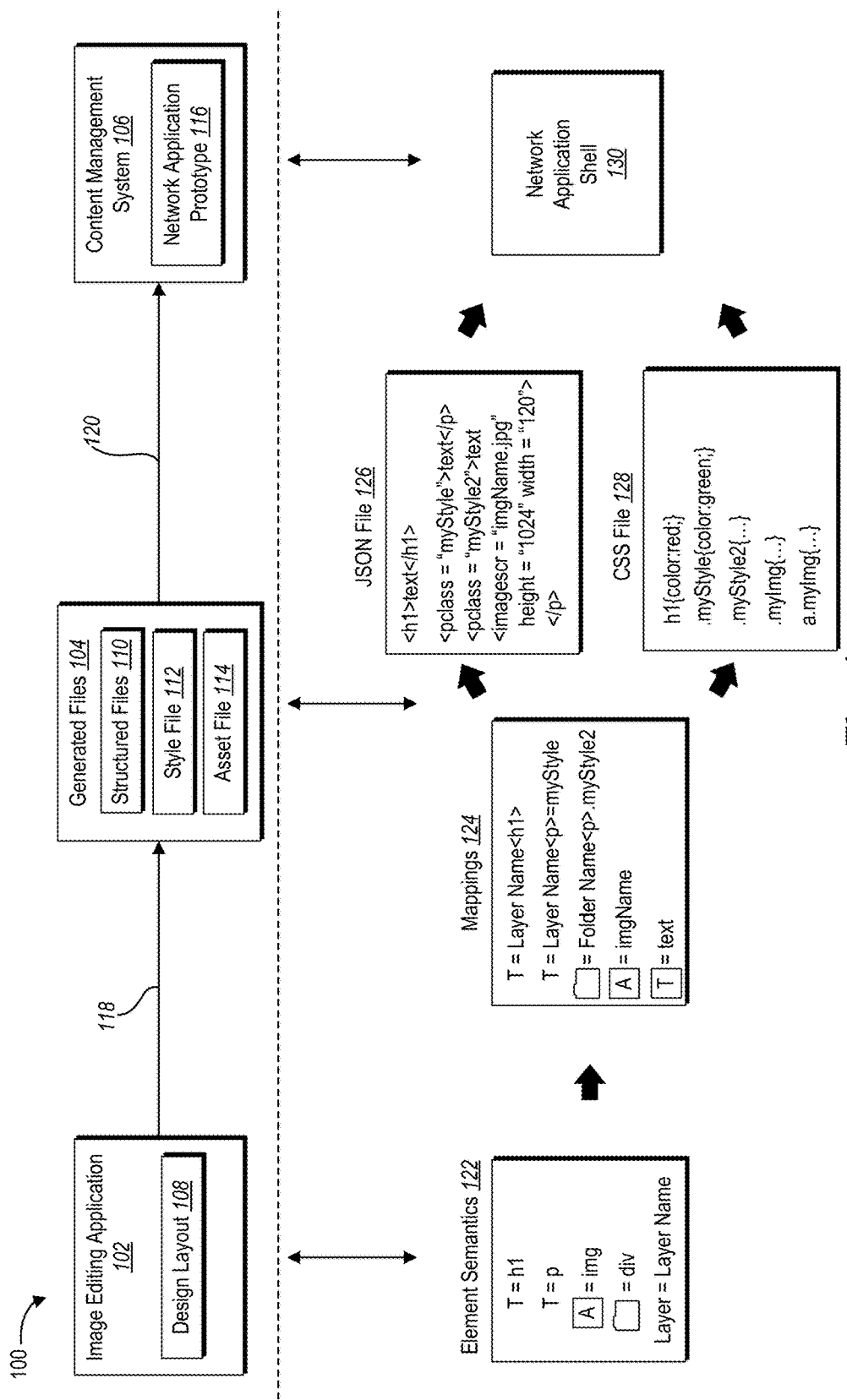
FIG. 1 illustrates an example environment for creating a network application from a design layout in accordance with one or more embodiments.

One or more embodiments of the present disclosure include a network application creation system that generates one or more network applications from a design layout. In multiple embodiments, the network application creation system described herein automatically generates one or more network applications from a design layout. The network application creation system provides one or more network applications to a user without requiring the user to hand code the design layout into the one or more network applications. For example, the user may submit a design layout and the network application creation system provides a network application shell, such as a network application prototype, to the user.

In some embodiments, the network application creation system receives the design layout for a user and generates structured files and style files from the design layout. The network application creation system also parses data in the files and run the data through one or more workflows. Additionally, the network application creation system generates one or more network application shells based on the output of the workflows. Further, the network application creation system publishes the network application shells as network applications.

In alternative embodiments, the network application creation system includes an image editing application and content management system. For example, a user uses an image editing application to create a design layout. The image editing application generates structured files and style files based on the design layout. The image editing application provides at least the generated files to the content management system and the content management system creates one or more network applications based on the files. In particular, the content management system parses data in the files, runs the data through one or more workflows, and creates one or more network application shells corresponding to the workflows.

In various embodiments, the network application creation system generates structured files and style files based on the semantics of design elements within the design layout. For example, when a user creates a design layout, the user can organize the elements into different layers. The name of a layer (e.g., "Home," "Splash," "Profile," or layer name) can specify the purpose of the layer as well as provide an indication for items in the layer. In some example embodiments, one or more layers are grouped into a folder (e.g., a folder layer) and the name of a folder (e.g., "background-Table," "image," "page #profile," or "text") provides context for the elements and/or sub-layers within the folder. As such, the network application creation system generates structured files and/or style files using the names of the layers and folders in a design layout.

The network application creation system provides a number of benefits and advantages, as mentioned above. As one example, the network application creation system enables a user to create and publish a layout design as one or more network applications without the need of a developer, hand coding each element as part of the network application, or waiting long periods of time. Further, the network application creation system does not require a designer to sacrifice ownership or control over his or her design, while still allowing the designer to test the design as a prototype and apply modifications before the design is published as a particular network application.

As used herein, the term "network application" generally refers to a hardware or software application that is supported over a network, such as the Internet. For instance, a network application can comprise a software application maintained and provided by a web server. In another instance, a network application is an application in which either the program being used, the data being accessed, or both reside on a network. In some cases, a network application refers to an application that provides functionality to an interface, set of interfaces, a portion of an interface, a webpage, etc. One example of a network application is a website. More specifically, in some embodiments, a website becomes a network application by extension of a browser or other application that is used to access the website. In this manner, the website itself becomes a network application by providing an interface and functionality to a user that enables a user to view, access, or otherwise interact with data provided via the webserver. Another example of a network application is native application for a mobile phone, a tablet computer, or other smart device. Yet another example of a network application is a widget that provides functionality to at least a portion of an interface. Still a further example of a network application is web application. The term "network application shell" generally refers to a prototype of a network application. A network application shell is generally a functional version of a design layout that allows a user to modify and tweak assets and components of the network application. A network application shell can, in one or more embodiments, be published as a network application.

As used herein, the terms "element" or "design element" refers generally to a digital element, which is an individual component of a design layout. An element has specified attributes and/or content, including other elements and text. An element also provides semantics. For example, an image element has a name indicating the nature of the element or the purpose of the element. Some examples of elements include, but are not limited to objects, images, text, folders, layers, tables, forms, and fields.

The terms "design," "design mock-up," or "design layout," as used herein, generally refers to a collection of design elements arranged in a particular manner. In some embodiments, a user creates a design layout. For example, a user can use an image editing application to create and modify a design layout. A design layout can include layers, folders, assets, components, and/or elements.

The term "asset" refers generally to, but is not exclusive to digital files. Example of assets including, but are not limited to images, digital documents, text, audible content, and motion pictures. Assets can be inserted and removed from a design layout. In addition, a user can select an asset to include in a design layout from an asset library or asset collection.

As used herein, the term "cascading style sheet" or CSS refers generally to a style sheet language used for describing the look and formatting of a document written in a markup language, such as a HTML (hypertext markup language) or a XML (extensible markup language) document. CSS uses elements such as the layout, colors, and fonts to organize the presentation of content. In general, CSS helps to improve content accessibility and to provide flexibility and control in presenting content.

FIG. 1 illustrates an example environment 100 for creating a network application from a design layout. The environment 100 includes an image editing application 102, generated files 104, and a content management system 106. The image editing application 102 includes a design layout 108. The generated files include a structured file 110, a style file 112, and at least one asset file 114. The content management system 106 includes a network application prototype 116.

As an overview of FIG. 1, the image editing application 102 uses the design layout 108 to produce (shown as reference number 118) the generated files 104. Then, using the generated files 104, the content management system 106 creates (shown as reference number 120) a network application prototype 116 and/or a published network application. A detailed description of creating a network application from a design layout will now be provided.

The design layout 108 includes a number of design elements, as described above. In one or more embodiments, each design element in the design layout 108 has a name that semantically describes the element, the location of the element, and/or the purpose of the element. Further, each design element includes attributes further associated with the element that provide metadata about the design element. For example, a text element has style attributes that indicate the color, font type, and font size of the text element. As another example, the text element has a position attribute that indicates the location of the text element within the design layout 108.

To illustrate, FIG. 1 shows element semantics 122 that may be related to one or more design elements from the design layout 108 within the image editing application 102. The element semantics 122 provides a chart of attributes, such as tags (shown as "T"), assets (shown as an "A" within a box), folders (shown as a folder icon), and layers. Each attribute has a corresponding value, as shown in the chart of attributes. Thus, as shown, the first tag has an attribute value of header 1 ("h1"), which indicates the text style of the one or more design elements to which the element semantics 122 relate. The second tag indicates that a paragraph ("p") attribute is associated with the one or more related design elements. The value of the asset attribute indicates the image ("img") associated with the one or more design elements, and the folder attribute value indicates a section or division ("div") associated with the one or more design elements. Further, the layer may indicate the layer name to which the one or more design elements belong.

One or more design element within the design layout 108 has a set of one or more semantic elements. By using the semantic elements associated with a design element, the image editing application 102 or another system generates structured files, style files, and asset files. In general, the image editing application 102 maps semantic elements for one or more design elements into a structured file (e.g., a JSON file, JavaScript, or XML file) and a style file (e.g., a CSS file). More specifically, as shown in FIG. 1, the image editing application 102 applies the mappings 124 to the element semantics 122 to generate a JSON file 126 and CSS file 128.

More specifically, the image editing application 102 first creates mappings 124 for each design element from the design layout 108. The image editing application 102 creates appropriate mappings based on the design element type, the name of the design element, and/or the element semantics 122 of the design element. For example, based on the design element type, the design element name, and/or the semantic elements associated with a particular design element, the image editing application 102 determines which mappings to create for design element.

For example, as described above, the element semantics for a design element can include a layer name associated with design element. As such, for a particular type of design element, the image editing application 102 creates a mapping that combines the layer name with one or more semantic element attributes. For instance, as shown in the mappings 124, the image editing application 102 creates a mapping that combines the layer name with each of the two tag attributes. Similarly, in creating a mapping for the design element, the image editing application 102 creates a mapping in the mappings 124 that appends the folder name associated with the design element to the folder attribute. Further, the image editing application 102 can add other attributes to the mapping 124, such as also adding a paragraph to the folder attribute, as shown.

In addition, the image editing application 102 creates one or more styles for the mapping of a design element based on attributes of the design element, including the one or more element semantics 122. Upon creating the styles, the image editing application 102 uses the styles in the mapping for the design element. For instance, as shown in the mapping 124, the image editing application 102 creates and uses "myStyle" with the second tag attribute and "myStyle2" with the folder attribute. The image editing application 102 can also create additional mappings for the design element.

Further, as part of creating a mapping for a design element, the image editing application 102 obtains assets, including images and texts from the design layout 108. For instance, as shown in FIG. 1, the mappings 124 include the "imgName" for a design element, which can be a copy of an image of a reference to the source of the image, as well as text from the design element (represented as "text" as shown in the mappings 124). The image editing application 102 provides the assets as part of generating the generated files 104 of the design layout 108, such as in generating an asset file 114.

As mentioned above, in various embodiments, the image editing application 102 can generate the generated files 104. In particular, the image editing application 102 uses the mappings 124 to create a JSON file 126, a CSS file 128, and an asset file (shown as the asset file 114). As the JSON file 126 illustrates, the image editing application 102 uses the mappings 124 to generate structured data corresponding to the design elements within the design layout 108. In some example embodiments, the structured file 110 may be an xml file, html file, JavaScript file, or other type of file that includes structured data.

In addition, the image editing application 102 generates a CSS file 128 based on the mappings 124 for design elements. For example, the image editing application 102 identifies stylistic and formatting attributes of design elements from the mapping 124 for the design elements and generates style data to include in the CSS file 128 and/or other style files 112. To illustrate, FIG. 1 shows style data in the CSS file 128 corresponding to one or more design elements in the design layout 108.

Upon creating the generated files 104, in one or more embodiments, the image editing application 102 provides the generated files 104, including the JSON file 126, the CSS file 128, and the one or more asset files to the content management system 106. The content management system 106 uses the generated files 104 to create a network application. In particular, and as described below, the content management system 106 creates a network application shell 130.

In some embodiments, the content management system 106 employs one or more workflows to create the network application shell 130 from the generated files 104. As an overview, the network application shell provides a functioning network application prototype. For example, the content management system 106 employs a website workflow, an application workflow, or another type of output workflow. For instance, the content management system 106 employs the application workflow to create a network application shell for a mobile application from the generated files 104. In another instance, the content management system 106 uses the website workflow to create a network application shell of a website from the generated files 104.

Once the content management system 106 creates a network application shell 130, in one or more embodiments, a user can view and/or test the functionality of the network application shell 130. If necessary, the user can apply modifications to the network application shell 130, such as add, remove, and/or change the functionality of assets and components in the network application shell 130. As such, a user can test and refine the look and functionality of the network application without sending a revised design layout to a developer to implement the changes and without needing to wait for the changes to be implemented.

In various embodiments, the content management system 106 publishes the network application shell 130. For example, if a user is satisfied with the look and functionality of the network application shell 130, the content management system 106 converts the network application shell 130 into a network application by publishing the network application shell 130. In some example embodiments, upon publishing the network application, the content management system 106 distributes the network application across appropriate distribution channels such that the network application is made available to other users.

Figure 2:
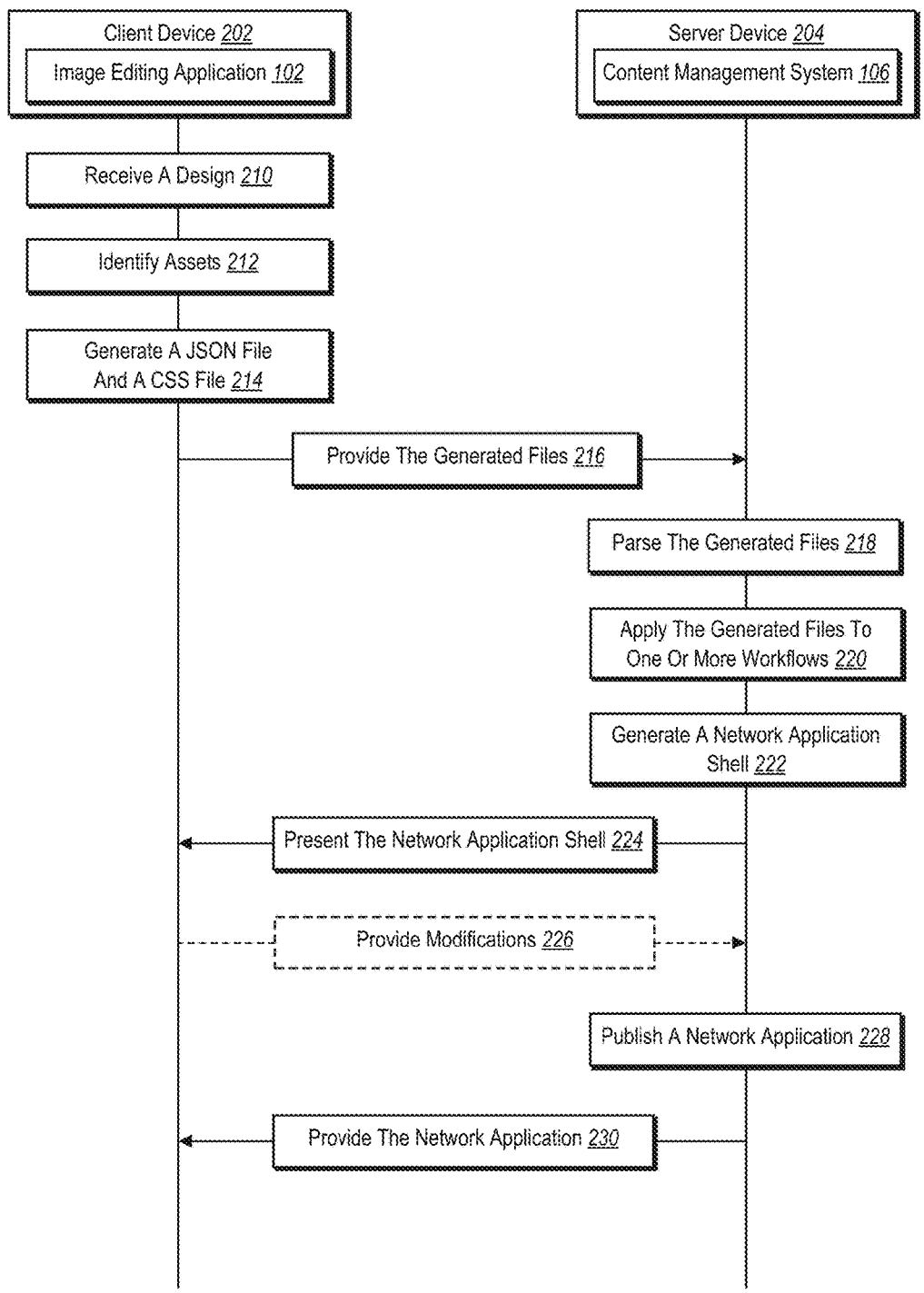
FIG. 2 illustrates a schematic diagram of a client device communicating with a server device to create a network application from a design layout in accordance with one or more embodiments.

FIG. 2 illustrates a schematic diagram of a client device 202 communicating with a server device 204 to create a network application from a design layout. As shown, the client device 202 includes an image editing application 102 and the server device 204 includes a content management system 106. The image editing application 102 and the content management system 106 described with respect to FIG. 2 may be example embodiments of the image editing application 102 and the content management system 106 described in connection with FIG. 1. Further, it should be noted that while some steps are shown as being performed by the client device 202 and other steps are shown as being performed by the server device 204, in some example embodiments, the server device 204 may perform each step described in connection with FIG. 2.

As shown in step 210 of FIG. 2, the image editing application 102 receives a design. For example, a user, such as a designer, may use the image editing application 102 to create a design by arranging and laying out design elements within the design. In at least one embodiment, the design includes multiple layers and organizes each layer using folders (e.g., folder layer, which is a folder within a layers panel that itself serves as a layer), including folders within folders. For instance, as assets and design elements are added to the design, the image editing application 102 associates each asset or design element with a corresponding folder layer.

In some example embodiments, the design includes names for each design element, asset, and layer (including a folder layer) such that the name provides sematic a meaning to the user and the image editing application 102. For example, when the image editing application 102 adds a header image to the design, the image editing application 102 can create a folder layer named "HeaderImage" and place the header image in the created folder. Grouping design elements by folder is a practice that designers commonly use to maintain structure and organize within the designs, especially when the design includes a large number of design elements that correspond with other design elements.

Alternatively, the image editing application 102 receives a design by downloading or otherwise obtaining a copy of the design. For example, a cloud storage device can include a stored design, and the user may provide a copy of the design to the image editing application 102 on the client device 202. As another alternative, the user may load the design onto the client device 202 using a portable storage device (e.g., flash drive, CD-ROM, portable hard-drive) and the client device 202 may provide the image editing application 102 access to the loaded design.

In step 212, the image editing application 102 identifies assets in the design. For example, the image editing application 102 creates a list of assets used in the design. In addition, the image editing application 102 indicates the source or location of the asset in the list of assets. In some cases, the image editing application 102 stores a copy of the asset itself in connection with the asset list. Alternatively, the image editing application 102 maintains the asset list and the source for each asset without storing a cache of the assets.

In one or more embodiments, the image editing application 102 generates a JSON file and CSS file as shown in step 214. For example, as described in connection with FIG. 1, the image editing application 102 generates the JSON file and the CSS file based on the design element types, element semantics, and/or a design elopement name associated with each design element. For example, given that a design element is an image and the image is stored within a folder layer labeled "footer," the image editing application 102 generates an entry in a JSON file or other structured file that associates the image with footer architecture. As another example, if the image editing application 102 detects a menu option in the design, the image editing application 102 creates an entry in the JSON file or other structured file that adds navigational functionality to the menu option. In some instances, the navigational functionality is provided by the name of the menu option.

Similarly, the image editing application 102 creates style files such as CSS files based on the design element types, the element semantics, and/or a design elopement name associated with each design element. Further, the image editing application 102 detects style attributes associated with a design element, such as one or more colors, size, font type, arrangement, transparency, etc. and adds style attributes to the CSS file in connection with the design element.

In step 216, the image editing application 102 provides the generated files to the content management system 106 on the server device 204. In one or more embodiments, the generated files include the list of assets and/or the asset files identified by the image editing application 102 as being used in the design. In some example embodiments, the generated files also include a copy of the design layout and/or applications associated with the design layout.

In some example embodiments, step 216 includes posting the generated files to a representational state transfer (REST) API. Posting the generated files to a REST API allows the content management system 106 to access the generated files. Further, posting the generated files to the REST API may send a trigger or other type of indication to the content management system 106 that the generated files are available for the content management system 106 to access and/or parse, as described below.

The content management system 106 parses the generated files, as shown in step 218. In particular, the content management system 106 parses the generated files to obtain design metadata from the generated files, such as asset structure and dynamic functionality of the design elements. In parsing the generated files, the content management system 106 creates the necessary folders and components on the server device 204 necessary to create a network application. As one example, the content management system 106 parses the generated files to determine how to set up a network application shell such that the network application reproduces the design and provides the proper functionality. In various embodiments, the step 220 of parsing is performed in connection with step 220.

In step 220, the content management system 106 applies the generated files to one or more workflows. In some cases, the content management system 106 provides the parsed metadata and the generated files to one or more workflows. Alternatively, the content management system 106 provides only the parsed metadata to the one or more workflows.

Using the output of the one or more workflows, the content management system 106 generates a network application shell (e.g., a network application prototype), as shown in step 222. For instance, the content management system 106 uses the design API from one or more workflows to process the generated files and/or parsed metadata to create a network application shell.

In various embodiments, if the content management system 106 employs multiple workflows, the content management system 106 can create multiple network application shells based on the design. For example, if the content management system 106 provides the generated files and/or parsed metadata to a mobile application workflow and a website workflow, the content management system 106 can create both a mobile application shell and a website application shell.

In step 224, the content management system 106 presents the network application shell to the client device 202. For example, after the content management system 106 creates a prototype of a network application based on the design, the content management system 106 provides the prototype to the designer via the client device 202. The prototype can include the content, layout, structure, and functionality projected from the design. The designer can view the prototype and test the usability of the prototype. For instance, if the network application shell is a website, the designer can navigate through the website and test the functionality and interoperability of each component on the website via the network application shell.

In some example embodiments, the designer, via the client device 202, can optionally modify the prototype by providing modifications to the content management system 106, as shown in optional step 226. For example, the content management system 106 provides editing tools for the designer to add, remove, or change components in the network application shell. In this manner, the content management system 106 allows for modification of the network application shell on the fly, and without the need of waiting on a developer to make the changes.

Once the designer is satisfied with the network application shell, the content management system 106 publishes the network application, as step 228 illustrates. Publication can include providing the network application to the designer via the client device 202, as shown in step 230. Publication can also include providing the network application to additional users and/or additional client devices.

As shown in steps 210-230, system can create a network application from a design. In particular, the system can create a network application without the assistance of a developer and without the need to perform front-end coding. In addition, a designer does not need to sacrifice ownership or relinquish control of the design to another party. Further, by eliminating additional parties in the development process, the time between design and publication or production is significantly reduced.

Figure 3A:
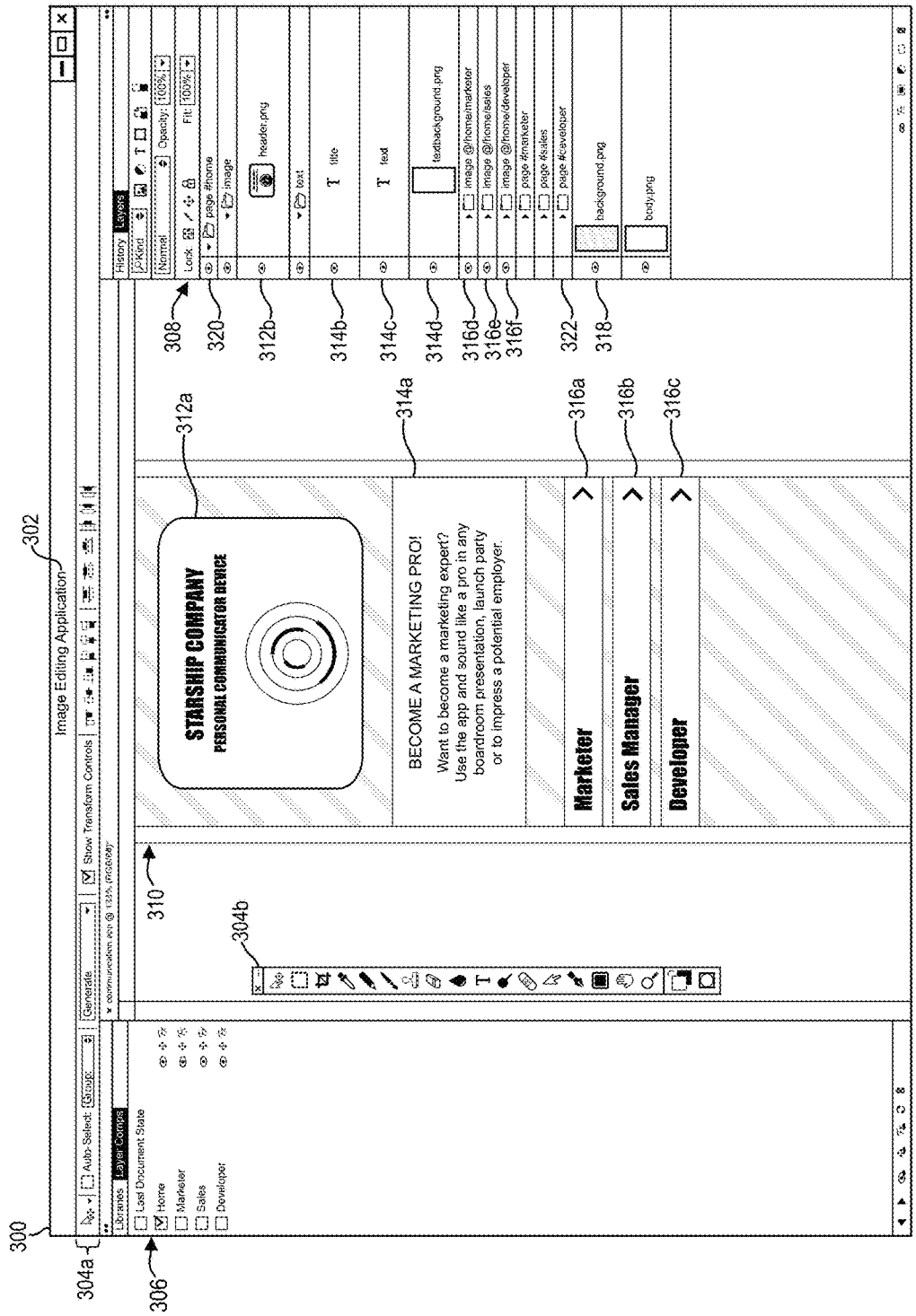
FIGS. 3A and 3B illustrate graphical user interfaces showing example design layouts within an image editing application in accordance with one or more embodiments.
Figure 3B:
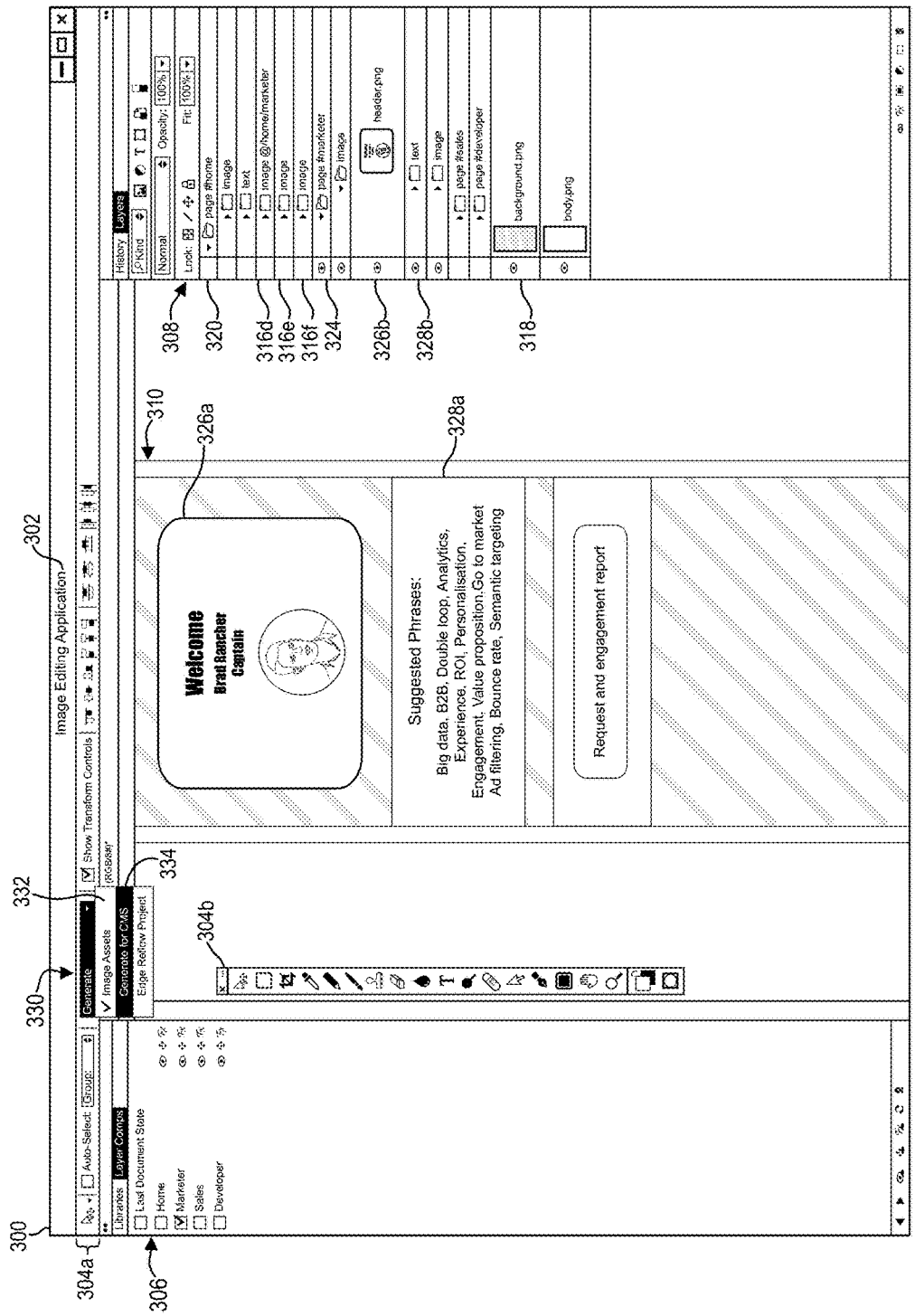
Figure 4A:
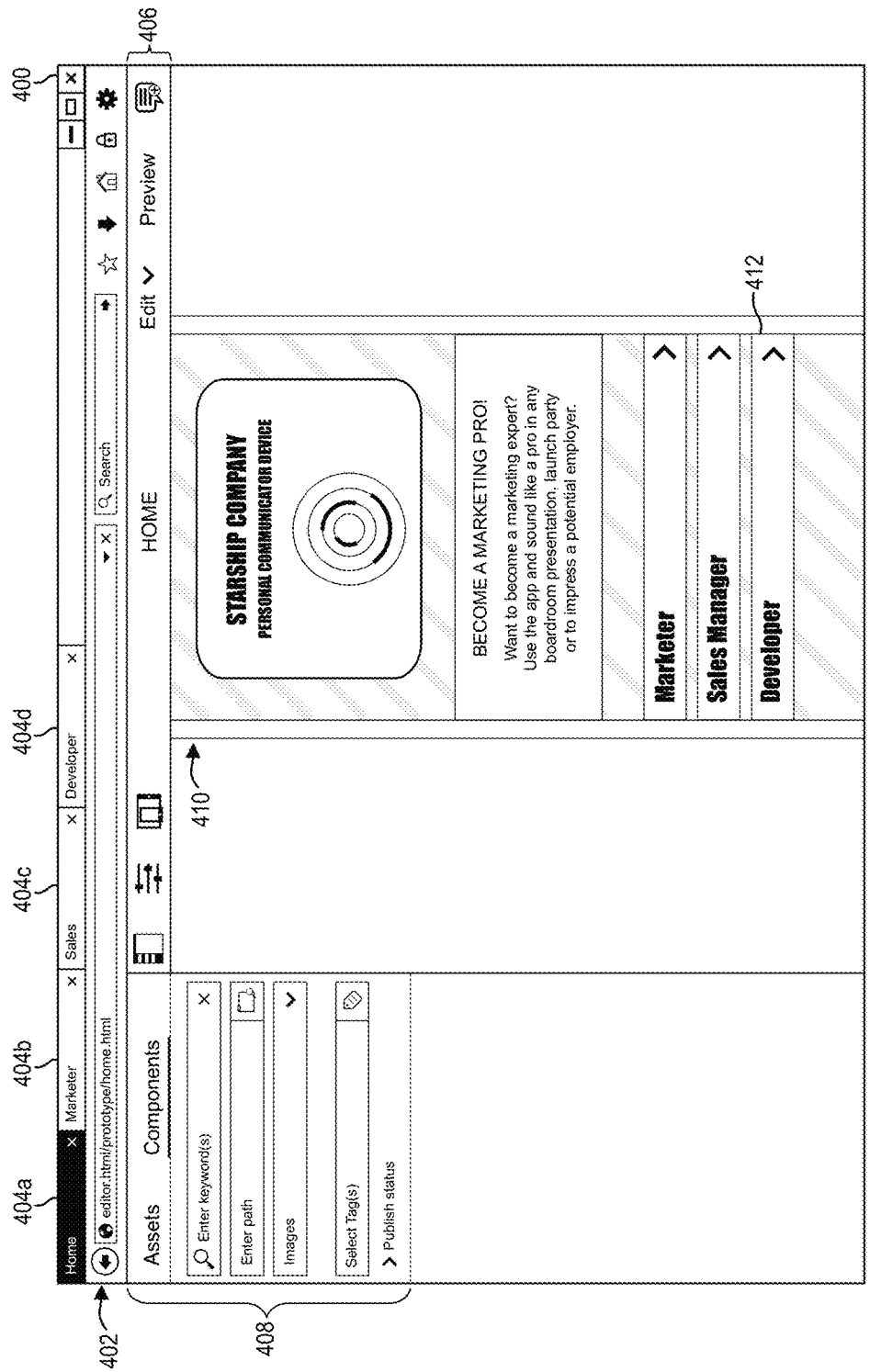
FIGS. 4A and 4B illustrate example graphical user interfaces showing network application shells of the example design layouts of FIGS. 3A-3B within a content management system in accordance with one or more embodiments.
Figure 4B:
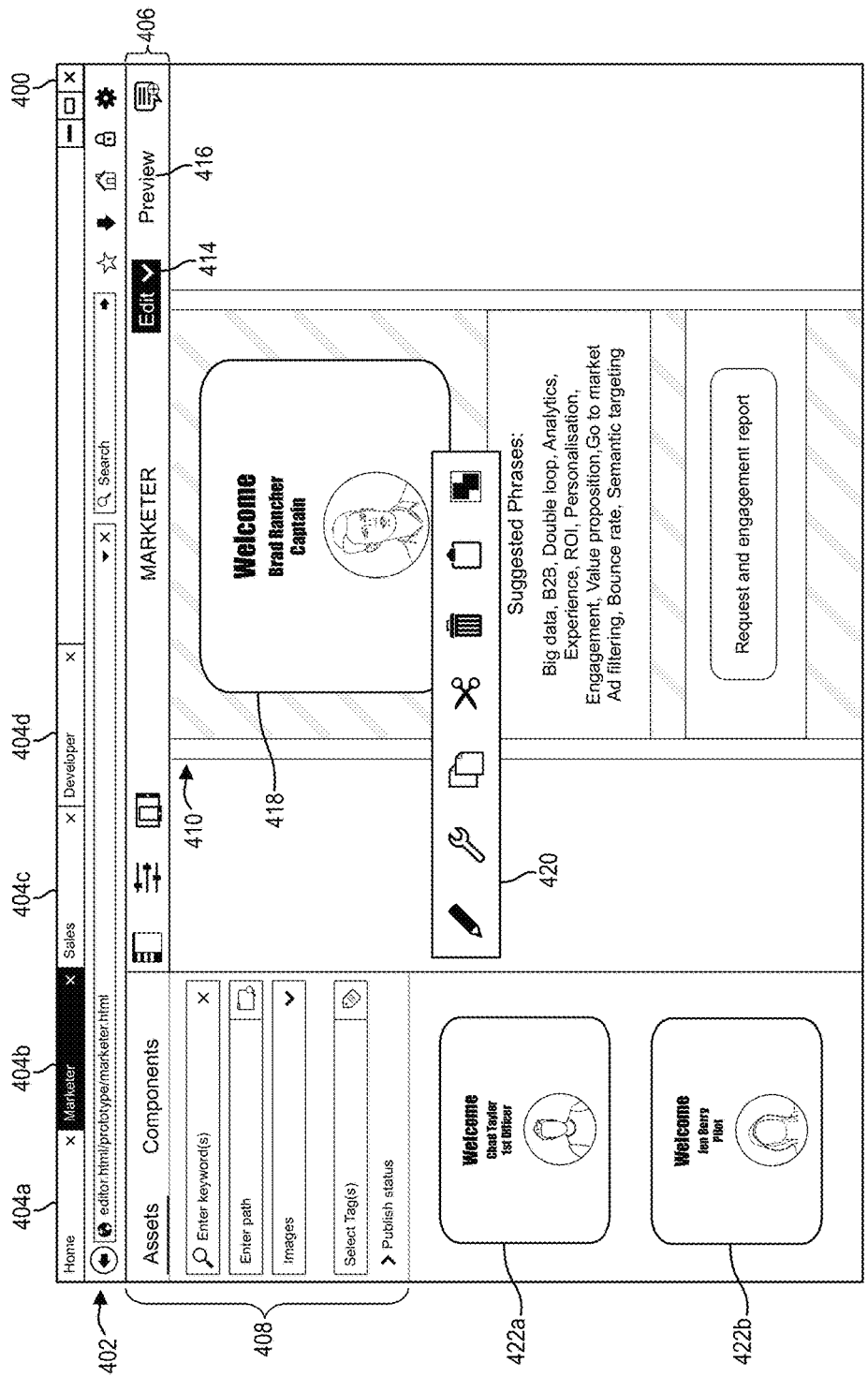
Figure 5:
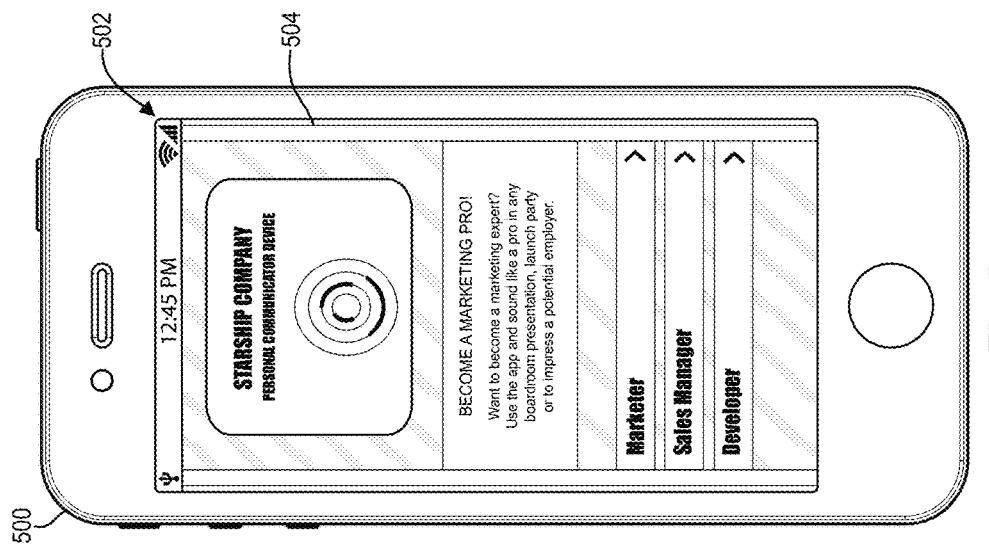
FIG. 5 illustrates an example graphical user interface showing a network application created from the design layout of FIG. 3A in accordance with one or more embodiments.

FIG. 3A through FIG. 5 illustrate examples and provide an overview of creating a network application from a design layout. In particular, FIGS. 3A and 3B illustrate graphical user interfaces showing example design layouts within an image editing application. FIGS. 4A and 4B illustrate example graphical user interfaces showing network application shells of the example design layouts of FIGS. 3A and 3B within a content management system. FIG. 5 illustrates an example graphical user interface showing a network application created from the design layout of FIG. 3A. One will appreciate that while FIG. 3A through FIG. 5 are directed towards creating a mobile network application, the systems and methods discussed in connection with the figures can also apply to other types of network applications.

Specifically, FIG. 3A shows a graphical user interface 300 of an image editing application 302, such as ADOBE® PHOTOSHOP®. The image editing application 302 can be an example embodiment of the image editing application 102 described above. The image editing application 302 can include various tools provided in toolbars 304a-b to assist a user in adding, removing, and/or editing design elements from a design. For example, the image editing application 302 enables a user to add assets from an assets collection to one or more pages of a design. It should be noted that the image editing application 302 can include additional or fewer tools and/or features than illustrated in FIGS. 3A and 3B.

Further, the image editing application 302 displays layer compositions 306 (i.e., page views or page compositions), a layers panel 308, and a network application design 310. In some embodiments, the layer compositions 306 provide visual aids to a user. In general, layer compositions 306 provide a different page views of the design. For example, selecting a layer composition makes layers that belong to the selected layer composition visible and layers not belonging to the selected layer composition invisible. Thus, when a user selects the "Home" layer composition, the network application design 310 displays only layers included in the home page view. When the user selects the "Sales" layer composition, the network application design 310 displays only layers included in the sales page view.

The layers panel 308 displays a list of layers associated with the network application design 310. In some embodiments, a single design element may be associated with a layer. For example, the background image layer 318 may include a background image (i.e., "background.png"). Further, as shown in the layers panel, the vertical position of the background image layer 318 may indicate the visibility of the layer with respect to the other layers in the layers panel 308. To illustrate, each layer listed above the background image layer 318 in the layers panel 308 is visible over the background image layer 318. Thus, if two layers overlap in the network application design 310, the image editing application will display the layer that is listed higher in the layers panel 308 in the network application design 310.

In one or more example embodiments, the layers panel 308 includes a folder layer (or simply "folder") or a layer is itself a folder. A folder in the layers panel 308 can include one or more design elements and/or additional folders. For example, the home page folder 320 (i.e., "page #home" folder) in the layers panel 308 is a folder layer (or simply "folder") that includes additional sub-layers and design elements. In some example embodiments, the image editing application 302 constructs a structured hierarchy in the network application design 310 based on the structure of folders and nested folders. For instance, the image editing application 302 can use the folder hierarchy within a layers panel to define which design elements belong to which page views.

Additionally, or in the alternative, the image editing application 302 indicates structure based on naming conventions of the layers and/or design elements. For example, the home page folder 320 (i.e., "page #home") may include design elements belonging to the home page view and the developer page folder 322 (i.e., "page #developer") may include design elements belonging to the developer page view.

In one or more embodiments, the layers panel 308 includes design elements that are associated with multiple layer compositions 306 or page views. For example, the background image layer 318 may associate with each layer composition in the layers composition 306. When creating the design and layout of the network application design 310, a user may specify which design elements apply to each layer, and if a design element applies to multiple layers.

As mentioned above, the "Home" layer composition is shown as selected in FIG. 3A. As such, the layers panel 308 shows, as visible, the layers associated with the home layer composition. In particular, the layers panel 308 illustrates a symbol of an eye to the left of each layer that is included as part of the home layer composition. Layers in the layers panel 308 that are not part of the home layer composition and, thus, not visible in the network application design 310, are shown without the eye symbol.

The network application design 310 is a mocked-up version of a network application. As illustrated, the network application design 310 includes a header element 312a, a description element 314a, and navigational elements 316a-c. The header element 312a provides a splash image and text of the network application. The description element 314a provides a description of the network application. The navigational elements 316a-c provide links to subpages (e.g., other layer compositions) of the network application.

The elements in the network application design 310 correspond to elements in the layers panel 308. For example, the header element 312a corresponds to an image layer 312b, which include the image "header.png" used in the header element 312a. Likewise, the description element 314a corresponds to a title layer 314b, a text layer 314c, and text background image layer 314d that form the description element 314a.

As another example, the navigational elements 316a-c correspond to the image folders 316d-f in the layers panel 308. Further, as mentioned above, a user may name a folder, layer, and/or design element in the layers panel 308 to indicate structure and/or functionality. Thus, as an example, a user may name the image folder 316d associated with the marketer navigational element 316a as "image @/home/marketer" to indicate that the image folder 316d and the included design elements link to the marketer page (shown in FIG. 3B as the "Marketer layer composition").

Alternatively, a user may otherwise create a link, add structure, or functionality between design elements in the network application design 310. For instance, a user can select an option from the image editing application 302 that specifies linking a design element to a particular page of the network application design 310, or that provides a particular functionality when a consumer interacts with the design element (e.g., returns a result to the user).

In various embodiments, the naming convention used to name a design element and/or a layer (including a folder layer) may be in accordance with a theme structure associated with the content management system. For example, the content management system may provide a theme, data file, or API to the image editing application 302 describing the naming convention. In addition, the image editing application 302 uses the theme to assist a user in providing compatible names for each design element and/or layer. In this manner, a user can modify names of one or more design elements and/or layers as long as the names comply with the theme structured used by the content management system. Similarly, if the image editing application 302 provides selectable options to a user, the options can be in accordance with the structured theme of the content management system.

As previously mentioned, FIG. 3B illustrates the marketer page view (i.e., the marketer layer composition) in the image editing application 302. For example, FIG. 3B displays the marketing page view in the network application design 310. The network application design 310 includes a profile header element 326a and a suggested phrases element 328a along with other design elements.

As described above, the network application design 310 displays the marketing page view based on a user selecting the marketer layer composition in the in the layer compositions 306. In particular, and as shown in FIG. 3B, when a user selects the marketer layer composition, layers associated with the marketer page view are selected in the layers panel 308 (indicated by the eye symbol next to each visible layer) and layers not belonging to the marketer page view are hidden. To illustrate, as shown in the layers panel 308, the marketer page folder 324, the header image layer 326b (i.e., header.png), the text folder 328b, and other layers in the marketer page folder 324 are visible while layers belonging only to the home page folder 320, the sales page folder, and developer page folder are hidden. Further, additional layers belonging to the marketer layer composition, such as the background image layer 318 and body image layer, are also visible.

Once a user finishes designing the network application design 310 or if the user desires to view a prototype of the network application design 310, in one or more embodiments, the image editing application 302 generates files from the network application design 310. More specifically, the image editing application 302 generates structure files, style files, and asset files from the network application design 310.

To illustrate, in one or more embodiments, a user selects the generate menu 330 shown in the toolbar 304a. Upon selecting the generate menu 330, the generate menu 330 expands (e.g., drop down) and provides additional generation options, such as an image assets option 332 and a content management system (CMS) generation option 334. When a user activates or selects the image assets option, the image editing application 302 includes a copy of the asset files as part of the generated files. When a user selects the CMS generation option 334, the image editing application 302 creates the generated files for the content management system. Alternatively, rather than providing the generate menu 330, the image editing application 302 provides another option or method for a user to request the image editing application 302 to generate files. Further, in some example embodiments, the image editing application 302 automatically creates and sends the generated files to the content management system.

FIG. 4A illustrates an example graphical user interface 400 of a browser application 402 accessing the content management system and displaying a network application shell 410 within the content management system. As an overview, the browser application 402 includes pages or tabs 404a-d, where each tab displays a different page view of the network application shell 410 as provided by the content management system. For example, when a user selects the home tab 404a, the content management system provides the home page view of the network application shell 410. When the user selects the marketer tab 404b, the content management system provides the marketer page view of the network application shell 410, as shown in FIG. 4B.

In general, the network application shell 410 is a prototype of the network application design created by the user. As such, the network application shell 410 allows a user to view application elements as they will appear in a published network application. Thus, as a user cycles through each tab shown in the browser application 402, the content management system presents a prototype of each page view to the user. Further, the content management system allows a user to interact with application elements that have functionality within the network application shell 410. For example, upon a user selecting the developer element 412, the content management system can load or open the developer page view of the network application shell 410 (e.g., open up the developer tab 404d) within the browser application 402. If the application element provides a different functionality, the content management system may, if possible, provide the programed functionality.

Besides enabling a user to view and interact with the network application shell 410, the content management system also provides the user with tools and options to modify the network application shell 410. For example, the content management system can provide a toolbar 406 and a tool panel 408. The toolbar 406 and tool panel 408 are described further in connection with FIG. 4B.

As shown in FIG. 4B, the content management system displays the marketer application page to a user. In other words, the network application shell 410 in FIG. 4B displays a prototype of the network application design from FIG. 3B. For instance, the content management system displays the title "MARKETER" in the toolbar 406 indicating that the content management system is providing the user with the marketer page view.

As mentioned previously, the content management system shown in FIG. 4A includes a toolbar 406 and tool panel 408 to assist a user in viewing, testing, and editing the network application shell 410. For example, the toolbar 406 provides menu options, navigational options, viewing options, editing options, and/or previewing options. In particular, the toolbar 406 includes an edit option 414 and a preview option 416.

The edit option 414 allows a user to switch from a viewing and interaction mode to an editing mode. For instance, while in editing mode, when a user selects the header element 418, the content management system provides an element toolbar 420 that further allows a user to edit the header element. In another instance, in editing mode, a user can select a block of text and modify the text directly in the content management system. The preview option 416 allows a user to preview and publish the network application shell 410 as a network application.

The tool panel 408, as shown, also includes various tools and options. For example, the tool panel 408 allows a user to search, add, remove, or edit assets or components from the network application shell 410. In addition, in one or more embodiments, the tool panel 408 provides status updates, such as the publishing status of the network application shell 410.

In some embodiments, the tool panel 408 provides the user with available assets from an asset collection that the content management system can add to and/or replace with an existing application element in the network application shell 410. For example, the content management system may allow for a swap the header element 418 with one of the alternative header elements 422a-b shown in the asset library (which may appear in some example embodiments upon the user selecting the edit option 414). In this manner, the content management system allows for modifications and updates to the network application shell 410 before publishing the network application shell 410.

When a user is satisfied with the look, feel, and functionality of the network application shell 410, the content management system publishes the network application shell 410 as a network application. As mentioned above, in some instances, the user selects the preview option 416 to view and publish the network application.

FIG. 5 illustrates a mobile device 500 having a graphical user interface 502 that displays a mobile network application 504 created from the design layout shown of FIG. 3A. The mobile network application 504 can include all of the design elements from the network application design, and can function using the functionality specified in the network application design.

In one or more embodiments, the user (e.g., the designer) can provide the mobile network application 504 to other users to enable the other users to use the network application. In some example embodiments, the content management system assists the user in distributing the mobile network application 504 to other users. For example, the content management system provides the mobile network application 504 to other users directly or via an application repository (e.g., an application store).

Figure 6:
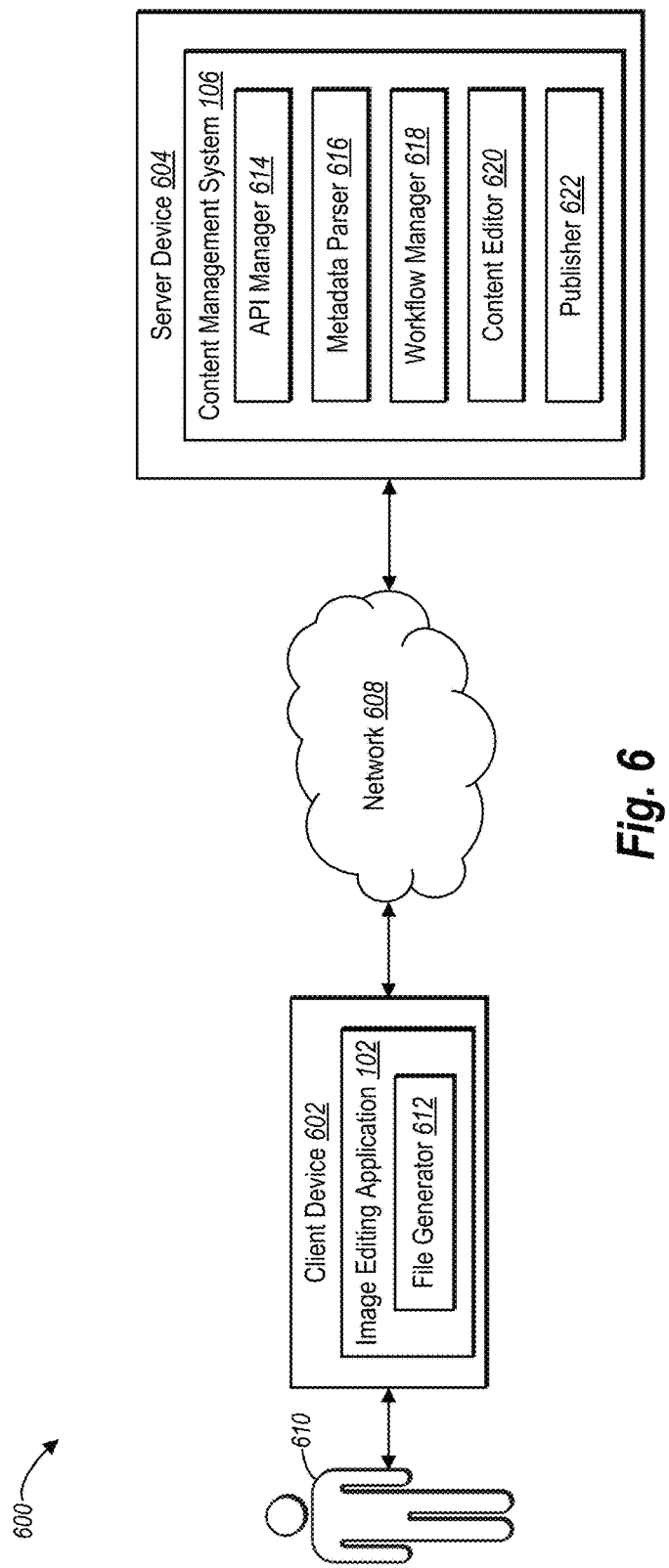
FIG. 6 illustrates an example communication system for creating a network application from a design layout.

FIG. 6 illustrates an example communication system 600 for creating a network application from a design layout. The communication system 600 includes a client device 602 and a server device 604 that can communicate via a network 608. The client device can include an image editing application 102 having a file generator 612. The server device 604 can include a content management system 106 that includes an API manager 614, a metadata parser 616, a workflow manager 618, a content editor 620, and a publisher 622.

As illustrated in FIG. 6, a user 610 interfaces with the client device 602, for example, to access or use the image editing application 102. The user 610 may be an individual (i.e., human user), a business, a group, or other entity. Although FIG. 6 illustrates only one user 610, it should be understood that the communication system 600 can include a plurality of users that access or use the image editing application 102. As described above, in some embodiments, the image editing application 102 is located on the server device 604 and the user 610 may use the client device 602 to access and/or use the image editing application 102 in connection with the content management system 106.

As mentioned above, the client device 602 and the server device 604 communicate via the network 608. The network 608 may include one or more networks and may use one or more communications platforms or technologies suitable for transmitting data and/or communication signals. Additional details relating to communication platforms and technologies are explained below with reference to FIG. 9.

The client device 602 and the server device 604 can be example embodiments of the client device 202 and the server device 204 described in connection with FIG. 2. Further, the image editing application 102 and the content management system 106 can be example embodiments of the image editing application and the content management system described above. In addition, although the communication system 600 of FIG. 6 is depicted as having various components, the communication system 600 may have any number of additional or alternative components.

Further, while FIG. 6 illustrates a particular arrangement of the components 612-622 on the image editing application 102 and the content management system 106, in some embodiments, the image editing application 102 may store the components 612-622. In alternative embodiments, the content management system 106 may store the components 612-622. For example, the content management system 106 perform the functions of the file generator 612 as will as the functions of the components 614-622, as described below.

Additionally, the components 612-622 of the communication system 600 can comprise software, hardware, or both. For example, the components 612-622 can comprise one or more instructions stored on a non-transitory computer-readable storage medium and executable by processors of one or more computing devices, such as a client device or server device. When executed by the one or more processors, the computer-executable instructions of the communication system 600 can cause the computing device(s) to perform the feature learning methods described herein. Alternatively, the components 612-622 can comprise hardware, such as a special purpose processing device to perform a certain function or group of functions. Additionally, or alternatively, the components 612-622 of the communication system 600 can comprise a combination of computer-executable instructions and hardware.

In some example embodiments, the client device 602 can represent a variety of computing devices. For example, the client device 602 may be a mobile device (e.g., a mobile telephone, a smartphone, a PDA, a tablet, a laptop, a camera, a tracker, a watch, or a wearable device). In some embodiments, the client device 602 may be a non-mobile device (e.g., a desktop computer or another type of client device). Additional details with respect to the client device 602 are discussed below with respect to FIG. 9.

As mentioned above, the client device 602 includes the image editing application 102. The image editing application 102 enables a user to create, arrange, layout, and/or modify a design. Examples of designs include network application designs, as described above. The image editing application can comprise a design tool that allows a user, such as a designer, to create visual mock-ups of a design. More particularly, the image editing application employs the theme or structure used by the content management system.

As shown the image editing application 102 includes a file generator 612. The file generator 612 creates generated files based on the design. In particular, the file generator 612 generates structured files, style files, and/or asset files based on the design elements in the design. In one or more embodiments, the file generator 612 uses the design element arrangement, layers, element names, and/or element semantics to create generated files.

Once the file generator 612 creates the generated files, the image editing application 102 provides the generated files, and in some instances, additional files, to the server device 604. For example, the image editing application 102 provides the generated files directly to the server device 604, and in some cases, bypass the network 608. In another example, the image editing application 102 posts the files to a REST API, and the content management system 106 on the server device 604 retrieves the files.

The server device 604 may include one or more client devices that perform the functions of the content management system 106. Upon receiving the generated files, which may include one or more asset files, the content management system 106 on the server device 604 can create a network application. Additional detail regarding creating a network application from a design and the generated files will now be provided.

As mentioned above, the server device 604 includes a content management system 106 that includes an API manager 614, a metadata parser 616, a workflow manager 618, a content editor 620, and a publisher 622. The API manager 614, in various embodiments, obtains the generated files and/or additional files associated with the design. For example, if the generated files are posted to an API, such as a REST API, the API manager 614 obtains the generated files via the REST API. In some example embodiments, the API manager 614 receives the generated files directly from a client device.

The metadata parser 616 parses metadata from the generated files. For instance, the metadata parser 616 parses the generated files to determine how to set up a network application shell such that the network application shell reproduces the design and provides the proper functionality. In some example embodiments, the metadata parser 616 parses the generated files multiple times to allow multiple workflows that may access the parsed metadata. Alternatively, the metadata parser 616 parses the generated files once and each of the multiple workflows may access the same parsed metadata.

The workflow manager 618 processes the generated files, parsed metadata, and/or other data associated with the design through one or more workflows. By applying the generated files and, in some cases, other data to a workflow, the workflow manager 618 generates a network application shell, which is a prototype of the design.

In some embodiments, such as with theme standardization, if a user requests multiple types of network applications, the workflow manager 618 creates multiple network application shells from the same design by using multiple workflows. For example, by using a mobile application workflow and a website workflow, the workflow manager 618 can create both a mobile application shell and a website application shell. Additional description regarding using workflows is provided above.

The content editor 620 allows a user to view, test, and/or modify a network application shell. For example, the content editor 620 provides a view and allows for interaction with a network application shell. In addition, the content editor 620 allows for testing of the functionality of application elements in a network application shell. Further, the content editor 620 allow for the addition, removal, or modification of application elements from the network application shell.

The content management system 106 also includes a publisher 622. The publisher 622 publishes a network application shell into a network application. In some example embodiments, the publisher 622 automatically publishes a network application, bypassing the review and modification stage provided by the content editor 620. Further, as described above, the publisher 622 can assist a user in distributing the network application to other users, such as consumers.

Figure 7:
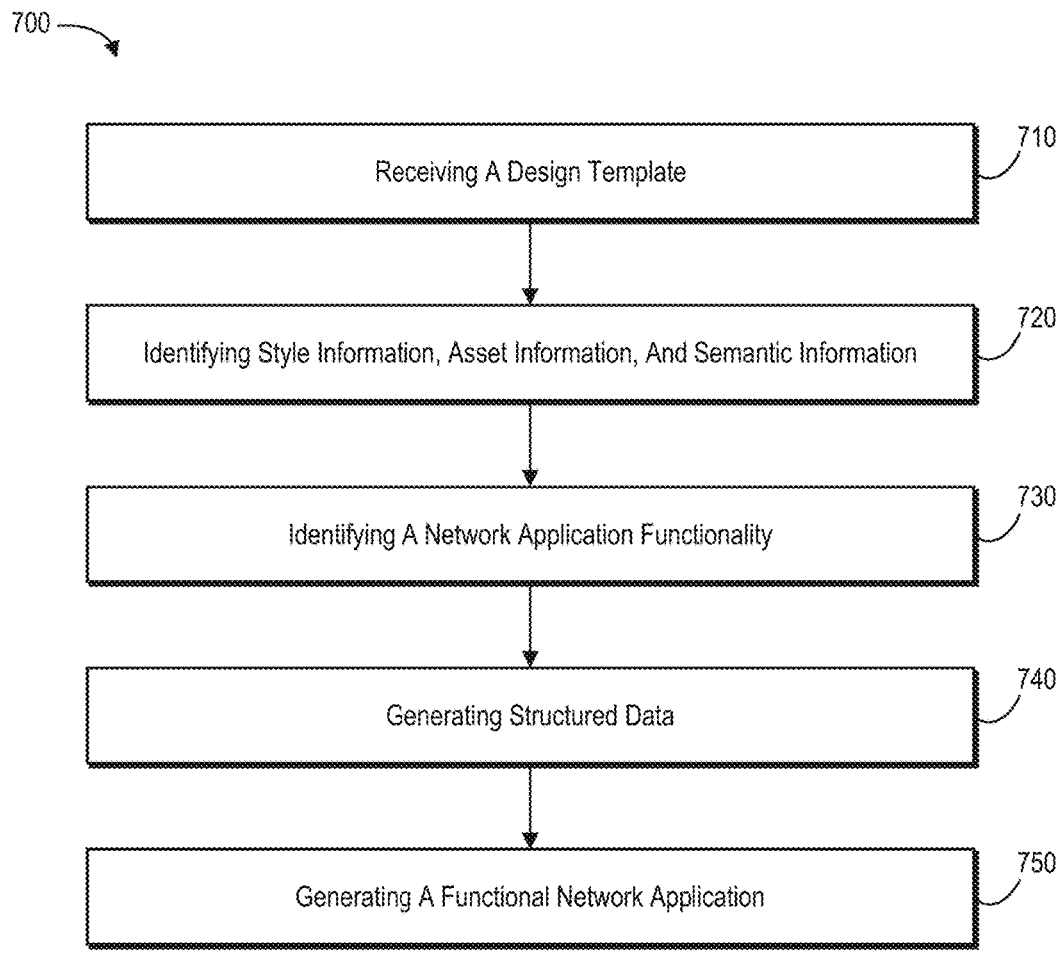
FIG. 7 illustrates a flowchart of a series of acts in a method for automatically generating network applications from a design in accordance with one or more embodiments.
Figure 8:
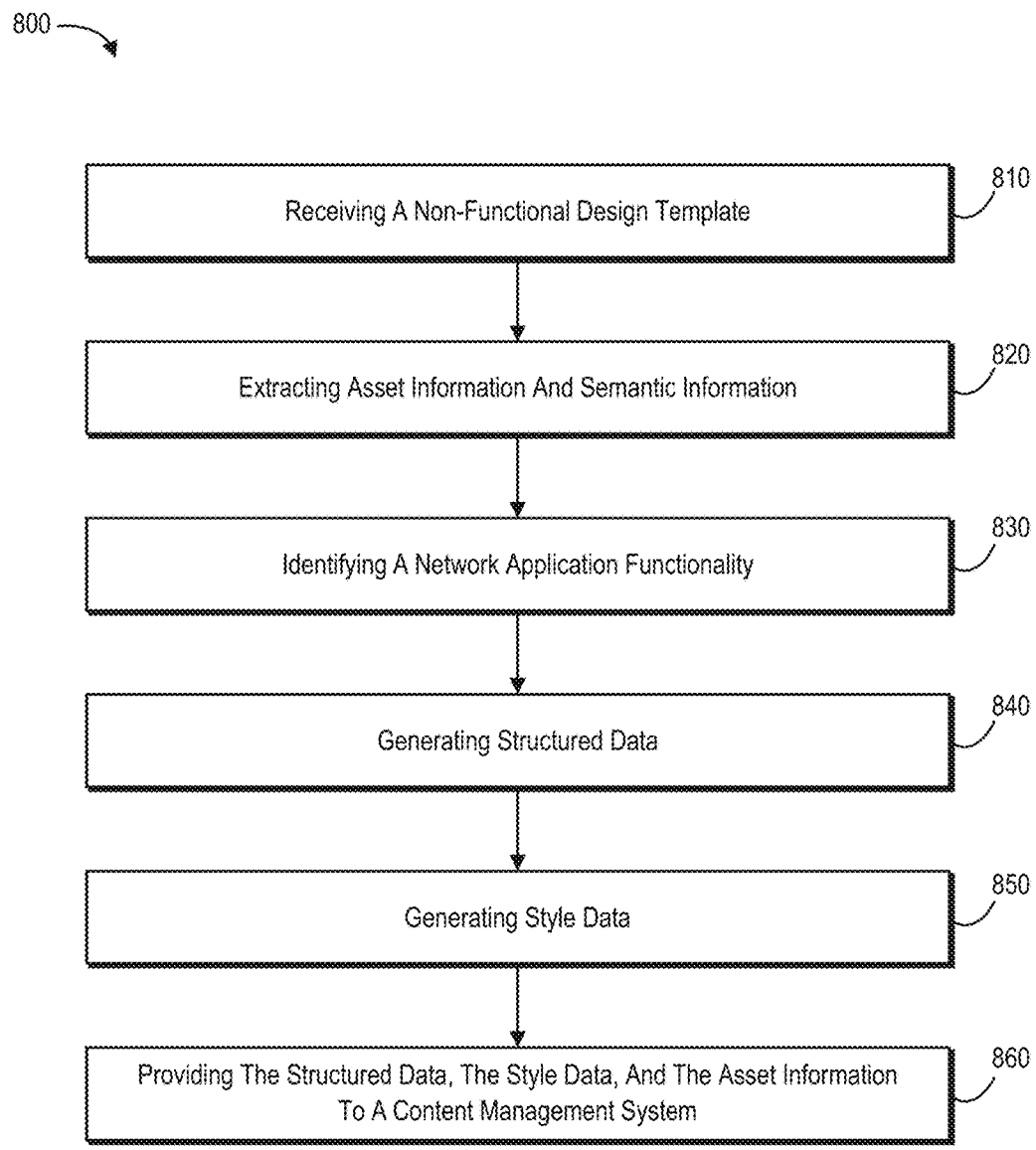
FIG. 8 illustrates a flowchart of a series of acts in a method for automatically generating a network application from a design layout in accordance with one or more embodiments.

FIGS. 1-6, the corresponding text, and the examples, provide a number of different systems and devices for creating a network application from a design in accordance with one or more embodiments. In addition to the foregoing, one or more embodiments can also be described in terms of flowcharts comprising acts and steps for accomplishing a particular result. For example, FIGS. 7 and 8 illustrate flowcharts of exemplary methods and systems in accordance with one or more embodiments. The methods and systems described in relation to FIGS. 7 and 8 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method 700 for automatically generating network applications from a design. The method 700 can be performed in a digital medium environment for designing digital web and mobile compositions. In some example embodiments, a client device and/or a server device performs the method 700 for automatically generating network applications from a design.

The method 700 includes an act 710 of receiving a design mock-up. In particular, the act 710 may involve receiving a design mock-up comprising a plurality of elements. For example, the act 710 can involve a user design the design mock-up using an image editing application. In some example embodiments, the act 710 can involve receiving the design mock-up from a remote computing device, such as from a client device or a server device.

The method also 700 includes an act 720 of identifying style information, asset information, and semantic information. In particular, the act 720 may involve identifying style information, asset information, and semantic information from the plurality of elements in the design mock-up. In one or more embodiments, an image editing application can identify the style information, asset information, and semantic information. In addition, the act 720 can involve identifying the style information from the semantic information, where the semantic information can include the name of one or more design elements.

The method further 700 includes an act 730 of identifying a network application functionality. In particular, the act 730 may involve identifying a network application functionality for the plurality of elements in the design mock-up based at least in part on the semantic information from the plurality of elements in the design mock-up. For example, the act 730 may involve determining functionality for an element based on matching the semantic information for an element from a structured theme, identifying the functionality from the structured theme, and applying the functionality from the structured theme to the element. In various embodiments, the act 730 involves identifying the network application functionality for the plurality of elements further based on the layout of the plurality of elements in the design mock-up.

In addition, the method 700 includes an act 740 of generating structured data. In particular, the act 740 may involve generating structured data indicating the layout of the plurality of elements and the identified network application functionality for the plurality of elements. In addition, the act 740 may involve identifying the plurality of elements from within the component library and applying corresponding defined structures from the component library to the identified plurality of elements. Further, the act 740 may involve an image editing tool generating the structured data.

The method 700 also includes an act 750 of generating a functional network application. In particular, the act 750 may involve generating a functional network application having the identified network application functionality based on the structured data, the style information, and the asset information. In one or more embodiments, the act 750 involves parsing metadata from the structured data, the style information, and the asset information to determine how to generate the functional network application such that the functional network application visually reproduces the design mock-up and provides functionality as well as involves generating the functional network application based on the parsed metadata. In some example embodiments, the functional network application is a rapid prototype of the design mock-up created without manual coding by a user. In some example embodiments, the act 750 may also involve applying one or more workflows to the structured data, the style information, and the asset information to generate the functional network application that replicates the layout of the design mock-up and adds functionality to the plurality of elements displayed within the functional network application.

Further, the method 700 may also include an act of publishing the network application. In one or more embodiments, the act 760 may further include posting the structured data, the style information, and the asset information to an interface and triggering generation of the functional network application upon detecting that the structured data, the style information, and the asset information to the interface is posted. In some instances, the interface can be a representational state transfer (REST) application programming interface (API). Further, the network application can be a website or a mobile application.

FIG. 8 illustrates a flowchart of a series of acts in a method 800 for automatically generating network applications from a design layout. The method 800 can be performed in a digital medium environment for designing digital web and mobile compositions. In some example embodiments, a client device and/or a server device can perform the method 800 for automatically generating network applications from a design.

The method 800 includes an act 810 of receiving a non-functional design mock-up. In particular, the act 810 may involve receiving a non-functional design mock-up, the design mock-up comprising a plurality of elements in arranged in a layout. In some example embodiments, the act 810 may include receiving the non-functional design mock-up from a client device.

The method 800 also includes an act 820 of extracting asset information and semantic information. In particular, the act 820 may involve extracting asset information and semantic information associated with each element of the plurality of elements. For instance, in some example embodiments, the act 820 may involve parsing each element of the plurality of elements to extract semantic information. In addition, the act 820 may also involve identifying asset information from an asset list that stores a listing of each asset used in the design mock-up. Further, the act 820 may involve identifying a component library comprising a plurality of defined elements and/or one or more design layers associated with the plurality of elements.

The method 800 further includes an act 830 of identifying a network application functionality. In particular, the act 830 may involve identifying a network application functionality for the plurality of elements in the design mock-up based at least in part on the layout of the plurality of elements in the design mock-up. In some example embodiments, identifying the network application functionality for the plurality of elements in the design mock-up may be further based on semantic information from the plurality of elements in the design mock-up.

The method 800 additionally includes an act 840 of generating structured data. In particular, the act 840 may involve generating, based on the semantic information, structured data indicating the layout of the plurality of elements and the network application functionality for the plurality of elements. In one or more embodiments, generating the structured data further comprises generating a different sub-structure for each design layer and/or sub-layer within the structured data.

Further, the method 800 includes an act 850 of generating style data. In particular, the act 850 may involve generating style data based on the plurality of elements indicating the style of the plurality of elements in the design mock-up. In some example embodiments, the generated style data is a CSS. In addition, the act 850 may further involve generating style data based on semantic information and metadata associated with the plurality of elements.

The method 800 also includes an act 860 of providing the structured data, the style data, and the asset information to a content management system. In particular, the act 860 may involve providing the structured data, the style data, and the asset information to a content management system thereby allowing the content management system to automatically generate a network application by providing the plurality of elements with the identified network application functionality. In one or more embodiments, the content management system uses the structured data, the style data, and the asset information to publish the design mock-up into a network application mock-up.

In one or more additional embodiments, the method 800 may include identifying semantics associated with each element of the plurality of elements. In addition, the identified semantic information can include a folder name associated with each element of the plurality of elements. Further, generating the structured data further can include mapping each element of the plurality of elements to a defined structure based on the folder name associated with the element.

Embodiments of the present disclosure may comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The term "digital environment," as used herein, generally refers to an environment that is implemented, for example, as a stand-alone application (e.g., a personal computer or mobile application running on a computing device), as a module of an application, as a plug-in for applications, as a library function or functions that may be called by a network application creation system, and/or as a cloud-computing system. A digital medium environment allows users to create, edit, and/or a network application.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
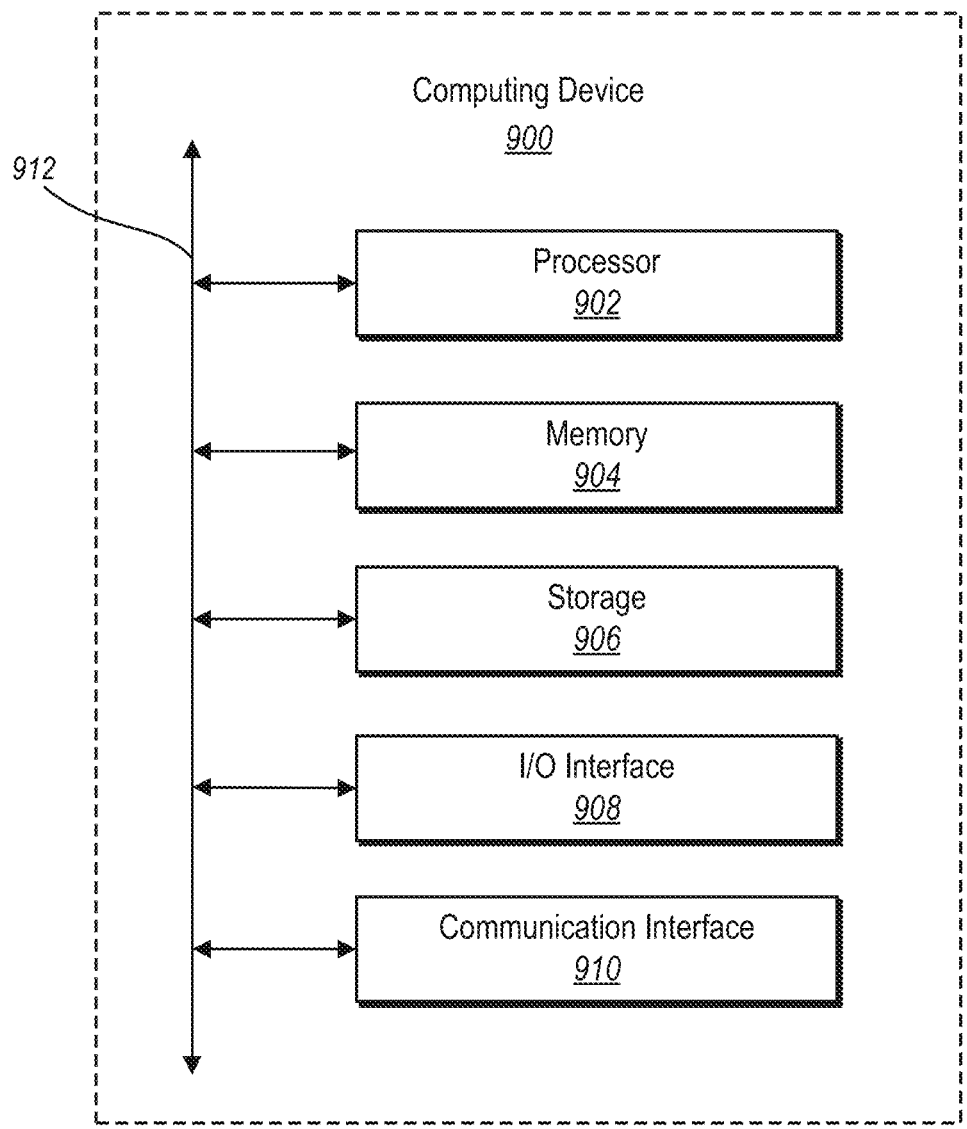
FIG. 9 illustrates a block diagram of an exemplary computing device in accordance with one or more embodiments.

FIG. 9 illustrates a block diagram of an exemplary computing device 900 that may be configured to perform one or more of the processes described above. One will appreciate that one or more computing devices, such as the computing device 900 may implement the client device 202, 602, server device 204, 604, and mobile device 500 described with respect to previously described figures. As shown by FIG. 9, the computing device 900 can comprise a processor 902, memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In particular embodiments, the processor 902 includes hardware for executing instructions, such as those making up a computer program. As an example and not by way of limitation, the processor 902 may execute instructions by retrieving (or fetch) the instructions from an internal register, an internal cache, the memory 904, or the storage device 906, and decoding the instructions, and executing the instructions. In particular embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage device 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The storage device 906 includes storage for storing data or instructions. As an example and not by way of limitation, the storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. The storage device 906 may include removable or non-removable (or fixed) media, where appropriate. The storage device 906 may be internal or external to the computing device 900. In particular embodiments, the storage device 906 is non-volatile, solid-state memory. In other embodiments, the storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from the computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 may facilitate communications via various communication protocols. Examples of communication protocols that may be used include, but are not limited to, data transmission media, communication devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communication networks and technologies.

The communication infrastructure 912 may include hardware, software, or both that couples components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

I claim:

1. In a digital medium environment for designing digital web and mobile compositions, a method for automatically generating network applications from a design, the method comprising:
    receiving a design mock-up image comprising a plurality of elements;
    identifying style information, asset information, and semantic information from the plurality of elements in the design mock-up image;
    identifying a network application functionality for the plurality of elements in the design mock-up image based on the semantic information from the plurality of elements in the design mock-up image and a layout of the plurality of elements in the design mock-up image;
    generating, by at least one processor and based on mapping the semantic information from the plurality of elements in the design mock-up image and the layout, structured data indicating the layout of the plurality of elements and the identified network application functionality for the plurality of elements; and
    generating a network application, which has the identified network application functionality, using the structured data, the style information, and the asset information.

2. The method of claim 1, wherein the design mock-up image comprises a layered image file.

3. The method of claim 1, wherein generating the network application comprises applying one or more workflows to the structured data, the style information, and the asset information to generate the functional network application that replicates the layout of the design mock-up image and adds functionality to the plurality of elements displayed within the functional network application.

4. The method of claim 1, wherein an image editing tool generates the structured data based on mapping the semantic information for the plurality of elements.

5. The method of claim 1, wherein generating the structured data comprises identifying the plurality of elements from within a component library and applying corresponding defined structures from the component library to the identified plurality of elements, and wherein the network application comprises one or more of a website or a mobile application.

6. The method of claim 1, wherein generating the structured data based on mapping the semantic information comprises applying the mapping to the semantic information for the plurality of elements within the design mock-up image to generate a JSON file and a CSS file.

7. A non-transitory computer readable medium comprising instructions thereon that, when executed by at least one processor, cause a computer system to:
receive a non-functional design mock-up image file, the design mock-up image file comprising a plurality of elements in arranged in a layout;
extract asset information and semantic information associated with each element of the plurality of elements;
identify a network application functionality for the plurality of elements in the design mock-up image file based on the semantic information from the plurality of elements in the design mock-up image and the layout of the plurality of elements in the design mock-up image file;
generate, based on mapping the semantic information, structured data indicating the layout of the plurality of elements having the network application functionality for the plurality of elements;
generate style data based on the plurality of elements indicating the style of the plurality of elements in the design mock-up image file; and
provide the structured data, the style data, and the asset information to a content management system thereby allowing the content management system to automatically generate a network application by providing the plurality of elements with the identified network application functionality.

8. The non-transitory computer readable medium of claim 7, wherein the design mock-up image file is generated within an image editing application.

9. The non-transitory computer readable medium of claim 7, wherein the semantic information comprises a folder name associated with each element of the plurality of elements.

10. The non-transitory computer readable medium of claim 9, wherein the instructions, when executed by the at least one processor, cause the computer system to generate the structured data further by mapping each element of the plurality of elements to a defined structure based on the folder name associated with the element and the name associated with each element.

11. The non-transitory computer readable medium of claim 7, further comprising instructions, that when executed by the at least one processor, cause the computer system to identify a component library comprising defined elements comprising defined structures, wherein the instructions, when executed by the at least one processor, cause the computer system to generate the structured data by identifying the plurality of elements within the component library and applying corresponding defined structures from the component library to the plurality of elements.

12. The non-transitory computer readable medium of claim 7, further comprising instructions, that when executed by the at least one processor, cause the computer system to identify one or more design layers associated with the plurality of elements from the design mock-up image file, wherein the instructions, when executed by the at least one processor, cause the computer system to generate the structured data indicating the layout of the plurality of elements is based on the one or more design layers.

13. The non-transitory computer readable medium of claim 12, wherein the instructions, when executed by the at least one processor, cause the computer system to generate the structured data further comprises generating a different sub-structure for each design layer within the structured data.

14. The non-transitory computer readable medium of claim 7, wherein the generated style data is a CSS file.

15. The non-transitory computer readable medium of claim 7, wherein the content management system uses the structured data, the style data, and the asset information to publish the design mock-up image file into a network application mock-up image file.

16. In a digital medium environment for designing digital web and mobile compositions, a system for automatically generating network applications from a design, the system comprising:
at least one processor; and
at least one non-transitory computer readable storage medium storing instructions that, when executed by the at least one processor, cause the system to:
receive a design mock-up image comprising a plurality of elements;
identify style information, asset information, and semantic information from the plurality of elements in the design mock-up image;
identify a network application functionality for the plurality of elements in the design mock-up image based on the semantic information from the plurality of elements in the design mock-up image and a layout of the plurality of elements in the design mock-up image;
generate, based on mapping the semantic information from the plurality of elements in the design mock-up image, structured data indicating the layout of the plurality of elements and the identified network application functionality for the plurality of elements; and
generate a functional network application, which has the identified network application functionality, using the structured data, the style information, and the asset information.

17. The system of claim 16, further comprising instructions that, when executed by the at least one processor, cause the system to parse metadata from the structured data, the style information, and the asset information to determine how to generate the functional network application such that the functional network application visually reproduces the design mock-up image and provides functionality.

18. The system of claim 17, wherein the instructions cause the system to generate the functional network application based on the structured data, the style information, and the asset information by generating a functional network application shell based on the parsed metadata.

19. The system of claim 16, further comprising instructions that, when executed by the at least one processor, cause the system to:
- post the structured data, the style information, and the asset information to an interface; and
- trigger generation of the functional network application upon detecting that the structured data, the style information, and the asset information to the interface is posted.

20. The system of claim 19, wherein:
- the interface is a representational state transfer (REST) application programming interface (API); and
- the design mock-up image comprises a layered image file created in an image editing application.

* * * * *